(12) United States Patent
Nakamura et al.

(10) Patent No.: US 7,556,756 B2
(45) Date of Patent: Jul. 7, 2009

(54) PRODUCTION METHOD OF POLYURETHANE FOAM MOLDED ARTICLE

(75) Inventors: Masafumi Nakamura, Suita (JP); Hiroshi Ikuta, Amagasaki (JP); Masaru Suzuki, Sanda (JP); Hitoshi Maeda, Osaka (JP)

(73) Assignee: Bayer MaterialScience AG, Leverkusen (DE)

(*) Notice: Subject to any disclaimer, the term of this patent is extended or adjusted under 35 U.S.C. 154(b) by 152 days.

(21) Appl. No.: 11/302,837

(22) Filed: Dec. 14, 2005

(65) Prior Publication Data
US 2006/0131791 A1 Jun. 22, 2006

(30) Foreign Application Priority Data
Dec. 17, 2004 (JP) .............................. 2004-366178

(51) Int. Cl.
B29C 44/06 (2006.01)
(52) U.S. Cl. ......................... 264/45.5; 264/51; 264/53; 264/54
(58) Field of Classification Search .................. 264/51, 264/53, 54, 46.4, 255, 45.5
See application file for complete search history.

(56) References Cited

U.S. PATENT DOCUMENTS 4,956,133 A * 9/1990 Payne ............................ 264/39
5,424,014 A * 6/1995 Glorioso et al. ............ 364/45.3
2005/0173846 A1* 8/2005 Wirth et al. .................. 264/572

FOREIGN PATENT DOCUMENTS

| EP | 0 995 568 A1 | 4/2000 |
| JP | 11-293027 | 10/1999 |
| JP | 2003-334828 | 11/2003 |

OTHER PUBLICATIONS

"Metering Attachments for Blowing Agent for Foam Applications like Pentane and Carbon Dioxide $CO_2$".

* cited by examiner

Primary Examiner—Leo B Tentoni
(74) Attorney, Agent, or Firm—N. Denise Brown; Noland J. Cheung

(57) ABSTRACT

The present invention provides a method for producing a polyurethane foam molded article from a polyisocyanate compound, a polyol mixture containing polyol, a catalyst and a crosslinking agent, and a blowing agent, said method comprising continuously injecting the polyisocyanate compound, the polyol mixture and the blowing agent into a mold, using a molding machine capable of separately supplying the polyisocyanate compound, the polyol mixture and the blowing agent, while the timing of starting to inject the blowing agent is delayed after the start of injecting the polyisocyanate compound and the polyol mixture. The inventive method produces, in a single stage, a polyurethane foam molded article having the skin or high density portion selectively formed on portions of the molded article actually requiring them, where the proportions of the skin and the high density portion and the foamed core can be varied freely.

7 Claims, 2 Drawing Sheets

PRODUCTION METHOD OF POLYURETHANE FOAM MOLDED ARTICLE

FIELD OF THE INVENTION

The present invention relates to a method for producing a polyurethane foam molded article, which has both a high density portion and a core portion of a low density foamed layer, in a single continuous molding operation (one stage).

BACKGROUND OF THE INVENTION

A polyurethane foam molded article having a high density surface layer (hereinafter referred to as a "skin") has very good surface property in applications other than those where it is covered by a skin made of other material such as mattress and cushion. Therefore, a flexible polyurethane foam and a semi-rigid polyurethane foam are typically used in furniture, automobile interior components such as an arm rest, a steering wheel and a shift lever knob, shoe soles, and sporting goods. A rigid polyurethane foam has many applications such as an imitation lumber and a structural material.

Articles such as automobile steering wheel and shoe sole which require high wear resistance, for example, are usually made of a molded member covered by a skin on the surface thereof (or on the bottom in the case of shoe), with the inner portion (core) desirably having a lower density for better touch feeling.

Saddles of bicycles are also commonly covered by a skin because a high strength is required of the surface with which the rider makes contact and the portion where the saddle is mounted on the bicycle, with the core desirably having a lower density and softness for better ride comfort. In order to finish the painted surface with better appearance, the surface layer is required to have a high density.

In the case of a structural material made of a rigid polyurethane foam, too, it is known to provide a skin in order to finish the painted surface of the molded article with better appearance, while it is required to make the core from a foamed material of low density in order to reduce the weight of the molded article.

The polyurethane foam molded article will have higher commercial value and find wider applications if a skin and/or a high density portion is formed at a portion where it is required during use and the core is made of a foamed material having lower density and lower hardness in accordance to the required performance.

As a blowing agent used in foaming of a polyurethane resin, water and a so-called low boiling point liquid such as fluorinated hydrocarbon have been used. However, it is very difficult to form a skin on the polyurethane foam molded article by using water which is a commonly used blowing agent. Therefore, the so-called low boiling point liquid such as fluorinated hydrocarbon has been used in the production of the polyurethane foam molded article having a skin.

There are known molding technologies and apparatuses for producing the polyurethane foam molded article, where three or more kinds of polyurethane forming components containing the blowing agent based on the low boiling point liquid are weighed and mixed, with the apparatus designed so that materials containing the blowing agent based on the low boiling point liquid are weighed in constant proportions, mixed and discharged continuously. As a result, proportions of the skin and the foamed core of the molded article remain substantially constant and the skin can be formed over the entire surface of the molded article. However, it is not possible to form the skin selectively on those portions of the molded article which actually require the skin, and to change the hardness of those portions and change the density of the molded article itself.

Carbon dioxide gas, instead of fluorinated hydrocarbon, can be used as the blowing agent, and carbon dioxide foaming technology has recently been developed in which a molded foam article is produced from a raw liquid of polyurethane with carbon dioxide gas added beforehand. However, the addition of carbon dioxide to the polyol component tends to hinder the reaction and does not ensure the production of satisfactory polyurethane foam molded articles. In the case where carbon dioxide is added to isocyanate, because the amount of carbon dioxide dissolved in isocyanate is kept constant, it is not possible to form the skin selectively on portions of the molded article that actually require the skin, and to change the hardness of those portions and change the density of the molded article itself.

Thus, it has been conceived to supply carbon dioxide gas as a third component from a metering pump directly to a mixing head of a blowing machine, and an apparatus including the blowing machine has been developed. A molding technology which employs such an apparatus, however, is also intended for producing a molded article of uniform density. As such, it is designed to supply the raw materials containing carbon dioxide gas in constant mix proportions from the start to the end of charging the raw liquid of polyurethane into the mixing head. As a result, it is not possible to form the skin selectively on portions of the molded article which actually require the skin, to form a low density foamed core and to change the proportions of the skin and the low density core and the hardness of those portions or to change the density of the molded article itself.

A method for producing a polyurethane foam molded article by using a blowing machine of polyurethane resin is described in *Polyurethane World Congress* '97, P-185, wherein components required for foaming, such as an isocyanate, a polyol, a catalyst, a crosslinking agent and a low boiling point liquid such as fluorinated hydrocarbon, are charged separately by metering pumps from respective tanks into the mixing head.

JP-A-11-293027 discloses a method for producing a low density polyurethane foam by charging a polyol which is saturated with carbon dioxide dissolved therein as a blowing agent, a polyisocyanate component and a polyol component separately into a mixing head.

JP-A-2003-334828 discloses a method for producing a low density polyurethane foam with improved efficiency of entrapping carbon oxide by charging carbon dioxide into a raw liquid of polyurethane comprising a polyisocyanate component and a polyol component in a mixing head.

In the method described in *Polyurethane World Congress* '97, P-185, in order to obtain a molded article having homogeneous density and hardness, the blowing machine is configured to discharge the components required for blowing in predetermined quantities and continuously discharge a raw material of fixed composition. As a result, although a stable polyurethane foam molded article having substantially constant proportions of the skin and the foamed core is obtained, it is not possible to produce, in a single stage, a polyurethane foam molded article having the skin and high density portions selectively on portions of the molded article which actually require the skin and high density portions by changing the proportions of the skin and the foamed core.

In the method described in Japanese Unexamined Pat. Publication (Kokai) No. 11-293027, although density (foaming ratio) of the polyurethane foam molded article can be stabilized because a polyol saturated with carbon dioxide dissolved therein is used as a blowing agent, it is not possible to produce, in a single stage, a polyurethane foam molded article having the skin or high density portions selectively on portions of the molded article which actually require them by changing the proportions of the skin and the foamed core.

In the method described in JP-A-2003-334828, although a stable and low density polyurethane foam can be formed as a constant amount of carbon dioxide is continuously charged since the blowing agent into the raw liquid of polyurethane, it is not possible to produce, in a single stage, a polyurethane foam molded article having the skin and high density portions selectively on portions of the molded article which actually require the skin by changing the proportions of the skin and the foamed core.

Thus, although the conventional methods which employ the blowing agent are capable of molding the polyurethane foam molded article having uniform performance in a single stage, there are no methods which can produce, in a single stage, the molded article having the skin and high density portions selectively on portions of the molded article actually requiring them, which has the changed density or hardness of each portion by changing the proportions of the skin and the high density portions and the foamed core.

SUMMARY OF THE INVENTION

The present invention provides a method for producing, in a single stage, a polyurethane foam molded article having the skin or high density portion selectively formed on portions of the molded article actually requiring them, wherein the proportions of the skin and the high density portion and the foamed core can be varied freely.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
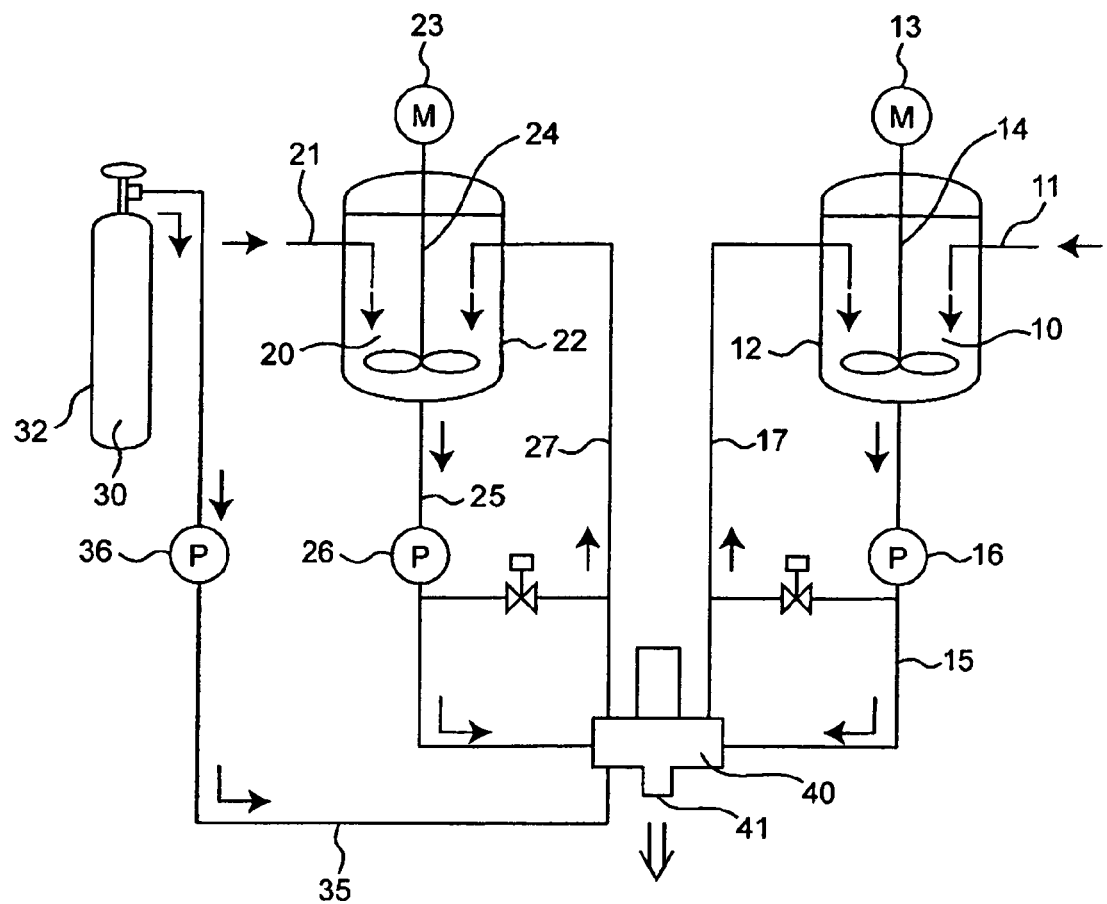
FIG. 1 shows a schematic representation of an apparatus used in the present invention.

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Equivalent weights and molecular weights given herein in Daltons (Da) are number average equivalent weights and number average molecular weights respectively, unless indicated otherwise.

The present invention provides an improved method for producing a polyurethane foam molded article from a polyisocyanate compound, a polyol mixture containing a polyol, a catalyst and a crosslinking agent, and a blowing agent, the improvement involving continuously injecting the polyisocyanate compound, the polyol mixture and the blowing agent into a mold, using a molding machine capable of separately supplying the polyisocyanate compound, the polyol mixture and the blowing agent, while the timing of starting to inject the blowing agent is delayed after the start of injecting the polyisocyanate compound and the polyol mixture.

The present invention makes possible the production, in a single stage (a single run of continuous molding operation), of a polyurethane foam molded article having a skin or a high density portion and a low density portion selectively on portions of the molded article actually requiring them by arbitrarily changing the proportions of the skin and/or the high density portion and the foamed core. In addition, because the skin or the high density portion is provided selectively on a portion of the molded article which actually requires it, the density of the molded article can be made lower while maintaining performance similar to that of the prior art.

In the present invention, there can be used a polyurethane resin blowing machine equipped with tanks which contain the components required for molding a polyurethane resin, for example, a polyisocyanate component and a polyol component and, as required, a blowing agent, metering pumps for metering and pumping the components and a mixing head for mixing the components.

According to the present invention, various blowing machines can be used for the polyurethane foam molding machine, such as a low-pressure blowing machine wherein the polyisocyanate component and the polyol component are metered and charged at a pressure from 0.1 to 5 MPa, preferably approximately 2 MPa, into a mixing head (a reaction and mixing apparatus which mixes the components and charges the mixture into a mold) and are mixed by a mixer provided in the mixing head, and a high pressure polyurethane blowing machine which mixes the components through collision at a high pressure of 10 MPa or higher, preferably in a range from 12 to 25 MPa in a mixing head. The high pressure polyurethane blowing machine is particularly preferred.

Accordingly, the method of the present invention can be applied also to the production of a urethane foam molded article using a mold and of a urethane foam article such as slab without using a mold.

It is necessary, however, that the blowing machine used in accordance to the present invention is provided with at least a tank for containing the blowing agent in addition to the tanks which contain a polyisocyanate component and a polyol component, and an independent pump which meters and charges the blowing agent into the mixing head.

The blowing agent may be either charged directly into the mixing head, or charged into the mixing head together with the polyol mixture after being charged into a feed line, located before the mixing head, of the polyol mixture and mixed therein.

It is necessary to provide a selector valve (normally hydraulically or pneumatically operated under the electrical control of a timer) which can control the start and end of charging of the blowing agent into the mixing head, separately from the polyisocyanate component and the polyol component, with the capability to set the timing of control with an increment of 0.1 seconds, preferably 0.01 seconds. For this purpose, it is preferable to provide a timer which can control the function described above.

For the molding apparatus used in the present invention, a modified version of a polyurethane blow molding machine produced by Canon Inc. provided with CANNOXIDE unit (which feeds liquid carbon dioxide separately to the mixing head, in this case) may be used, wherein a selector valve and a timer are provided so as to control the charging of the blowing agent from the CANNOXIDE unit to the mixing head at a controlled timing (delayed start of charging and earlier stop of charging) with an increment of 0.01 seconds. Specifically, a delay is introduced to the charging of the blowing agent after charging the polyisocyanate compound and the polyol mixture, and it is enabled to charge the polyisocyanate compound and the polyol mixture again after charging of the blowing agent has been completed.

In RIM (reactive injection molding) process where the raw liquid of polyurethane is injected through an injection gate into a closed mold, a mixture of the polyisocyanate compound and the polyol mixture which have been charged in advance (hereinafter referred to as a "first reaction mixture liquid") stays around the injection gate, and is pressed so as to fill the entire space of the mold by the pressure of injecting the mixture of the polyisocyanate compound and the polyol mixture containing the blowing agent to be charged subsequently (hereinafter referred to as a "second reaction mixture liquid") and the pressure generated by the foaming reaction.

Because the body of the first reaction mixture liquid receives a resistance to its movement on the surface thereof which makes contact with the mold surface, the second reaction mixture liquid flows through the central portion of the inner space of the mold under a tunnel effect in accordance to the kinetics of liquid flow, while the first reaction mixture liquid which is not in contact with the mold surface also moves to fill the inner space while making contact with the mold surface. The first reaction mixture liquid which makes contact with the mold surface forms the skin on the surface of the molded article. The second reaction mixture liquid which is charged later is blown in the mold because it contains the blowing agent, so as to form the foamed core having a density lower than that of the skin made of the first reaction mixture liquid.

The proportion and thickness of the skin formed on the molded article can be controlled through the amount of the first reaction mixture liquid which is injected before injecting the blowing agent, with more skin being formed at required portions with greater thickness as the amount of the reaction mixture liquid injected is increased.

The amount of the first reaction mixture liquid which is injected before injecting the blowing agent is preferably at least 10% by weight, more preferably, from 10 to 50% by weight, of the total amount of the first reaction mixture liquid and the second reaction mixture liquid injected into the mold.

A time interval from the start of injecting the first reaction mixture liquid to the start of injecting the blowing agent is preferably at least 0.1 seconds, more preferably, from 0.15 seconds to 3.0 seconds. When this time interval is larger, it becomes easier to form the skin at portions of the molded article requiring the skin.

It is also possible to inject the first reaction mixture liquid into the mold after ending the injecting of the second reaction mixture liquid into the mold, so that the first reaction mixture liquid remains near and at the injection gate. As a result, a portion of high density with smaller cell size can be formed in this portion. Therefore, when a sprue slug is cut off, the foamed core of larger cell size does not appear on the cut surface, thus solving the problems of the art such as painting failure and low heat resistance.

Proportions of the skin formed in the high density portion near and at the injection gate and the high density portion and the foamed core are determined in accordance to the amount of the first reaction mixture liquid injected into the mold after completing the injection of the second reaction mixture liquid into the mold.

The amount of the first reaction mixture liquid injected into the mold after completing the injection of the second reaction mixture liquid into the mold is preferably at least 1.0% by weight, for example, from 1.0 to 5.0% by weight of the total amount of the first reaction mixture liquid and the second reaction mixture liquid injected into the mold.

It is also necessary to control the discharging rate (rate of feeding to the mixing head) of the second reaction mixture liquid including the polyisocyanate compound, the polyol mixture and the blowing agent. When the discharging rate is too high, the first reaction mixture liquid which has been injected in advance may be washed off by the pressure of the second reaction mixture liquid which is injected later. The discharging rate of the polyisocyanate compound and the polyol mixture combined is preferably 800 g/second or lower, more preferably, from 50 to 800 g/second, although the discharging rate depends on the size of the molded article.

Total duration of injection into the mold is also controlled preferably to 1.0 second or longer, more preferably, from 1.2 to 10 seconds, more preferably from 1.5 to 10 seconds. When the total duration of injection into the mold is 1.5 seconds or longer, it is possible to provide a delay before starting to inject the blowing agent after the start of injection of the first reaction mixture liquid, and to control the selector valve and the timer which stop the injection of the blowing agent or the second reaction mixture liquid in order to inject the first reaction mixture liquid after ending the injection of the blowing agent. This makes it possible to obtain a molded article which has varying proportions of the skin, high density portion and the foamed core and clearly formed skin, high density portion and the foamed core.

To obtain skins of high density on both of the top and bottom surfaces of the molded article in the RIM molding process under the conditions described above, the thickness of the molded article is preferably 20 mm or less, more preferably 10 mm or less and most preferably from 2 to 10 mm. It becomes easier to form the skin on practical surfaces of the molded article and to make the sprue slug with a high density as a whole, when the thickness is not larger than 10 mm. While there may be a portion having no foamed core when it is less than 2 mm in thickness, the present invention is not restricted by the range of thickness described above in case a molded article having portions of different thickness is to be formed.

The injection gate is preferably located at the bottom of the mold (lower side of the molded article). When the injection gate is preferably located at the bottom of the mold, the first reaction mixture liquid and the second reaction mixture liquid which have been injected advantageously move from the injection gate toward the end of the mold while filling the inner space of the mold in the direction of thickness.

A molded article was fabricated by using a mold of open injection type without injection gate, while delaying the start of injecting the second reaction mixture liquid after the injection of the first reaction mixture liquid. When the second reaction mixture liquid is injected, it immediately turns into a foam of low density staying on the first reaction mixture liquid which has been injected in advance. Thus the first reaction mixture liquid is pressed by the expanding second reaction mixture liquid and spreads in the mold so as to form the skin, while the second reaction mixture liquid forms the foamed core. The thickness and forming position of the skin can be controlled by varying the amount and injection pattern of the first reaction mixture liquid to be injected first.

After completing the injection of the second reaction mixture liquid, it is possible to inject only the first reaction mixture liquid. And it becomes possible to form the skin on the portion of the molded article where it is required and achieve desired arrangement and proportion of the foamed core, by injecting the first reaction mixture liquid and the second reaction mixture liquid in such a manner as, for example, with horizontal injection, the first reaction mixture liquid is injected first, followed by the second reaction mixture liquid, and the first reaction mixture liquid is injected last.

In the open injection process, too, timing and quantities of injecting the polyisocyanate, the polyol mixture and the blowing agent are preferably the same as in the RIM molding process.

Although the thickness of the molded article made by open injection process is determined by the density of the second reaction mixture liquid which is blown to form the core, it can also be set relatively freely. A molded article having the thickness of 10 mm or larger, more preferably from 10 to 300 mm, most preferably, 100 mm can be produced.

To form the skin on the surface of the molded article where it is required or form a high density portion selectively in a particular location in the open injection process, it is desirable to maintain a fixed injection pattern so as to ensure reproducibility by using a robot or the like. When the molded article has a large surface area, it is preferable to attach a nozzle having a shape of folding fan or fish tail fin to the mixing head so that the polyisocyanate compound and the polyol mixture are injected while spreading from the mixing head.

The method according to the present invention can employ either the RIM process where the closed mold provided with an injection gate is used, or the open injection process without using an injection gate, while the RIM process is preferably employed. The RIM process makes it easier to control the proportion of molded article surface covered by the skin, and forms the high density portion, particularly near the injection gate easier.

According to the present invention, as described above, the polyurethane foam molding machine provided with the selector valve and the timer which can control the timing of injecting the blowing agent into the mold with an increment of 0.01 seconds is used, and the blowing agent is charged into the mixing head (injected into the mold) not simultaneously with the injection of the polyisocyanate compound and the polyol mixture, but with a time interval (delayed start or early stop if necessary). This makes it possible to produce a molded article which has varying proportions of the skin, the high density portion and the foamed core in the RIM process, namely to form the skin only in the portion of the molded article where it is required and form a high density portion in the sprue slug. It was also found that a molded article having the skin formed in the portion where it is required and a low density foamed core can be made also in the open injection process.

The apparatus shown in FIG. 1 is made from a first tank 12 which receives the polyisocyanate compound 10 through a supply pipe 11, a second tank 22 which receives the polyol mixture 20 through a supply pipe 21 and a mixing head 40. The tanks 12, 22 have mixers 14, 24 provided with motors 13, 23, respectively, so as to continuously stir and mix the materials stored in the tanks. The tanks 12, 22 and the mixing head are connected via feeder pipes 15, 25 which are provided with metering pumps 12, 26 and discharge pipes 17, 27. The polyisocyanate compound 10 and the polyol mixture 20 are fed from the tanks 12, 22 toward the mixing head in the direction indicated by arrow mark. A blowing agent (for example, carbon dioxide) 30 is stored in a bomb 32, and is fed through a supply pipe 35 provided with a metering pump 36 toward the mixing head 40 in the direction indicated by arrow mark. The mixing head 40 has a valve which can control (for example, delay) the supply of the blowing agent.

First, the polyisocyanate compound 10 and the polyol mixture 20 are continuously supplied to the mixing head 40, and are continuously injected into a mold (not shown) from a discharge port 41 of the mixing head 40. This causes a skin or a high density portion of the urethane foam to be formed later. Then with a delay, the blowing agent 30 is continuously supplied to the mixing head, and is continuously injected into the mold together with the polyisocyanate compound 10 and the polyol mixture 20 from the discharge port 41. This causes the urethane foam core to be formed later. Then in the last stage of injecting the materials into the mold, supply of the blowing agent 30 to the mixing head is stopped while supplying the polyisocyanate compound 10 and the polyol mixture 20 continuously to the mixing head 40. Thus, a skin or the high density portion is formed near the injection gate of the mold (and the surface of the molded article near the injection gate).

Figure 2:
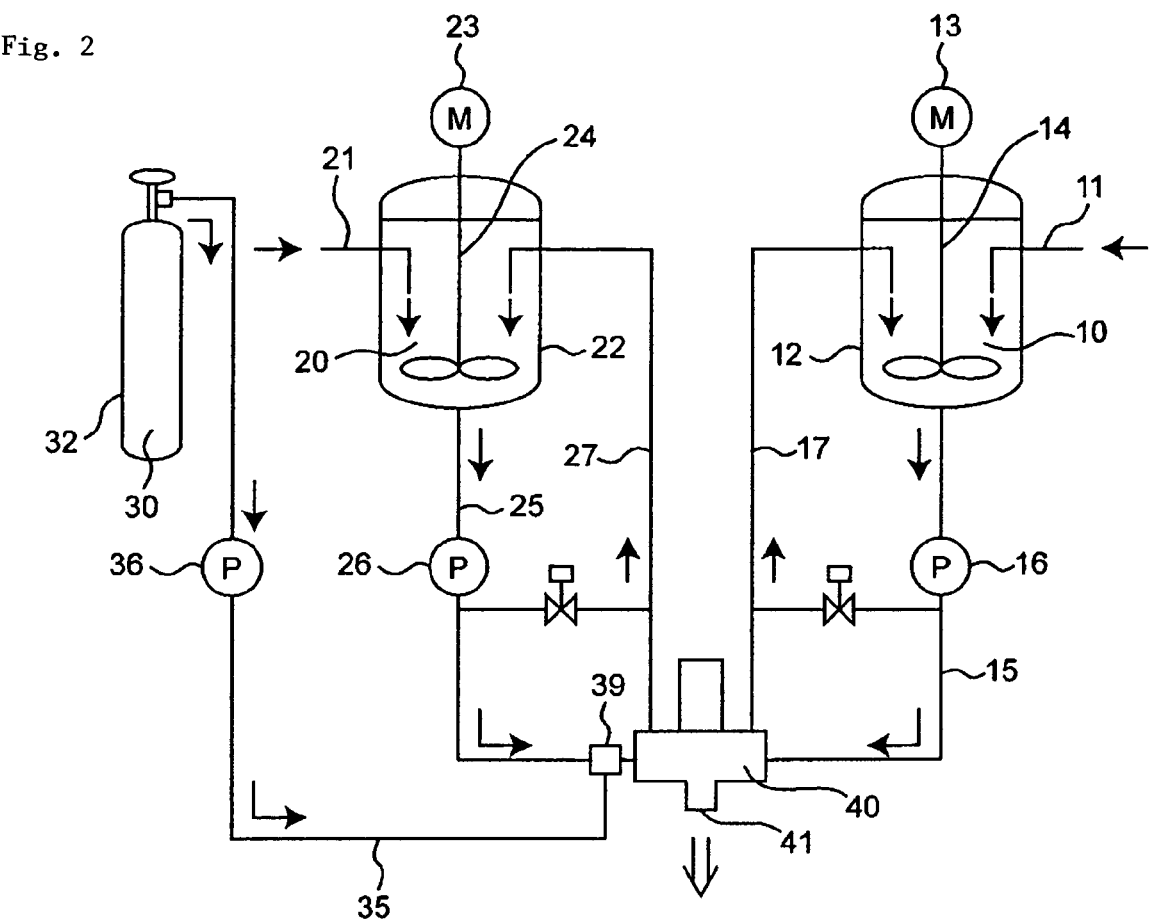
FIG. 2 depicts a schematic representation of an apparatus used in another aspect of the present invention.

The apparatus shown in FIG. 2 is similar to the apparatus shown in FIG. 1 except that the supply pipes 25, 35 are connected to a mixer 39 before reaching the mixing head. The polyol mixture 20 and the blowing agent 30 are mixed together in the mixer 39 before reaching the mixing head. This apparatus is advantageous when it is desired to mix the polyol mixture 20 and the blowing agent 30 in advance.

It is preferred to use the polyisocyanate and the polyol mixture, which satisfy required performance of a skin and a low density foamed core of a molded article and is also capable of forming a foamed low density portion that is stable to the open cell effect due to the addition of a blowing agent. In that case, the density of a free-rise foam obtained by reacting only a first reaction mixture liquid, which contains the skin and high density portion of the molded article, in a cap-free vessel in an open state is preferably at least 0.8 g/cm$^3$, and more preferably at least 0.85 g/cm$^3$. When the density is at least 0.85 g/cm$^3$, even if the density is adjusted to 0.2 to 0.8 g/cm$^3$, e.g. 0.20 g/cm$^3$, the resulting low density portion is stable to the open cell effect on foaming due to the addition of the blowing agent. It is also possible to satisfy performance of the high density skin formed of the first reaction mixture liquid.

Regarding the viscosity at 25° C. of the polyisocyanate compound and the polyol mixture, the viscosity of the polyisocyanate compound is preferably 2,000 mPa·s or less, and more preferably from 30 to 1,000 mPa·s, while the viscosity of the polyol mixture is preferably 10,000 mPa·s or less, and more preferably from 500 to 5,000 mPa·s.

When the viscosity at 25° C. of the polyisocyanate compound is from 30 to 1,000 mPa·s and that of the polyol mixture is from 500 to 5,000 mPa·s, the first reaction mixture liquid easily spreads in the mold when injected initially and also easily spreads by the second reaction mixture liquid.

Raw materials used in the present invention will now be described.

In the present invention, the polyisocyanate compound, and a polyol, a catalyst, a crosslinking agent and, if necessary, foam stabilizers, reinforcers and other auxiliaries used in the polyol mixture are not specifically limited.

Examples of suitable polyisocyanate compounds include diphenylmethane diisocyanate, polymethylene polyphenylene polyisocyanate, toluene diisocyanate, hexamethylene diisocyanate, isophorone diisocyanate, modified polyisocyanates obtained by modifying these polyisocyanates with urethane, allophanate, carbodiimide or isocyanurate, and mixtures thereof.

The polyol mixture contains a polyol, a catalyst, a crosslinking agent and, as required, foam stabilizers, reinforcers and other auxiliaries.

As the polyol, for example, there can be used polyetherpolyols having 2 to 6 hydroxyl groups in the molecule and an average hydroxyl group equivalent of 100 to 3,000, which are obtained by adding an alkylene oxide such as ethylene oxide or propylene oxide to hydroxyl group-containing compounds such as propylene glycol, diethylene glycol, glycerin, trimethylolpropane, pentaerythritol, sorbitol and sucrose, compounds having an amino group and a hydroxyl group such as triethanolamine and diethanolamine, or amino group-containing compounds such as ethylene diamine and diaminotoluene, or polymer polyols obtained by addition-polymerizing a vinyl compound to these polyether polyols.

There can also be used polyester polyols obtained from a polycarboxylic acid and a low molecular weight hydroxyl group-containing compound, lactone-based polyester obtained by ring-opening polymerization of caprolactone, polycarbonate polyol, polytetramethylene glycol obtained by ring-opening polymerization of tetrahydrofuran, and polyether polyamine which is obtained by aminating a hydroxyl group of polyether polyol or hydrolyzing an isocyanate prepolymer of polyether polyol, which have an average active hydrogen equivalent of 100 to 3,000.

The amount of the isocyanate compound and that of the polyol mixture are preferably adjusted so that the isocyanate index is 80 to 120.

As the catalyst, for example, there can be used tertiary amines such as triethylene diamine, pentamethyldiethylene triamine, 1,8-diazabicyclo-5,4,0-undecene-7, dimethylaminoethanol, tetramethylethylene diamine, dimethylbenzylamine, tetramethylhexamethylenediamine and bis(2-dimethylethyl)ether; and organometallic compounds such as dibutyltin dilaurate, tin octanoate and dibutyltin diacetate.

As the crosslinking agent, for example, there can be optionally used dihydric alcohols having a molecular weight of 62 to 300 such as ethylene glycol, propylene glycol, butanediol, hexanediol, neopentyl glycol, diethylene glycol, triethylene glycol, polyethylene glycol, dipropylene glycol and polypropylene glycol; and divalent amines such as diethyltoluenediamine, t-butyltoluenediamine, diethyldiaminobenzene, triethyldiaminobenzene and tetraethyldiaminodiphenylmethane. Polyether polyols obtained by adding an alkylene oxide to them can also be used. These crosslinking agents are described in JP-A-54-17359, JP-A-57-74325, JP-B-63-47726 and JP-B-01-34527.

As auxiliaries, for example, there can be optionally used foam stabilizers such as silicone-based foam stabilizers; surfactants; reinforcers; weathering agent such as antioxidants; ultraviolet absorbers; stabilizers such as 2,6-di-t-butyl-4-methylphenol and tetrakis[methylene 3-(3',5'-di-t-butyl-4-hydroxyphenyl)propionate]methane; and colorants.

As the reinforcer, for example, there can be optionally used fibers made of vitreous, inorganic and mineral substances, such as milled glass fiber, wollastonite fiber and processed mineral fiber; and flakes such as mica and glass flake. These components are normally added to a polyol mixture as a second component.

As the blowing agent, there can be used water (which reacts with a polyisocyanate compound to evolve a carbon dioxide gas), carbon dioxide, hydrocarbons such as pentane and cyclopentane, and fluorinated hydrocarbons such as chlorofluorocarbon (for example, HCFC141b) and fluorocarbon (for example, HFC245fa and HFC365mfc) according to the design of a polyurethane foaming machine. A mixture of the blowing agents can also be used according to circumstances. There can also be used a mixture of a blowing agent and a high molecular weight polyol having an OH equivalent of at least 1,000 (for example, 1,500 to 30,000) (for example, a mixture obtained by dissolving under pressure) (a weight ratio of the blowing agent to the high molecular weight polyol is from 5:95 to 95:5). Even if the high molecular weight polyol having an OH equivalent of at least 1,000 is used as a third component, it is not necessary to change the amount of the polyisocyanate compound to be discharged because of low reaction ratio to the polyisocyanate compound.

A mixture of a carbonate salt of an amine compound (which is dissociated upon the urethanization reaction to evolve a carbon dioxide gas) or an organic acid such as formic acid (which reacts with a polyisocyanate compound to evolve a carbon dioxide gas), as the blowing agent, and a polyol can also be used.

The blowing agent is preferably at least one of carbon dioxide, hydrocarbon, fluorinated hydrocarbon and water. A liquid carbon dioxide gas obtained by liquefying carbon dioxide or a mixture of the liquid carbon dioxide gas and a polyol is particularly preferable, and the liquid carbon dioxide gas is still more preferable. The use of the liquid carbon dioxide gas as the blowing agent causes neither an environmental problem due to ozone layer depletion nor problems such as flammability and high cost. The second reaction mixture liquid containing the liquid carbon dioxide gas causes foaming on injection into a mold, resulting in low density. Therefore, it does not penetrate into the first reaction mixture liquid injected previously and may be accumulated at the upper section of the first reaction mixture liquid, thus forming clear interface boundary between the skin and the core layer.

The average density of the polyurethane foam molded article is preferably from 0.2 to 0.8 $g/cm^3$.

The polyurethane foam molded article contains both a high density portion and a low density portion (namely, a foaming portion). It is preferably a molded article in which the high density portion has a density of at least 0.8 $g/cm^3$, e.g. 0.8 to 1.2 $g/cm^3$, and at least 50% of the entire surface of the molded article is covered by the high density portion. The density of the low density portion is preferably 0.7 $g/cm^3$ or less, e.g. 0.05 to 0.5 $g/cm^3$.

When the high density portion has a density of at least 0.8 $g/cm^3$, performance enough to serve as the skin can be attained. When at least 50% of the entire surface of the molded article is covered by the high density portion, the resulting urethane foam article has various uses such as shoe sole and saddle in which at least 50% (corresponding to one side) of the molded article may be covered by the skin.

The following Examples and Comparative Examples further illustrate the present invention in detail. Parts and percentages given in these examples are parts by weight and weight %, respectively, unless otherwise mentioned.

The skin thickness and the cell size such as the core part of foaming layer of the molded article were conformed by checking of cross-section of the molded article using a microscope.

In Example and Comparative example, the following compounds were used.

Polymethylene polyphenylene polyisocyanate having a NCO content of 31.5% and a viscosity of 130 mPa·s/25° C. was used as the polyisocyanate compound.

45 parts of polyether polyol having OHV of 35 mg KOH/g which was prepared by addition polymerization of propylene oxide and ethylene oxide with glycerin, 45 parts of polyether polyol having OHV of 28 mg KOH/g which was prepared by addition polymerization of propylene oxide and ethylene oxide with propylene glycol, 14 parts of ethylene glycol, 0.54 parts of 33% triethylene diamine solution in ethylene glycol, 0.125 parts of PELCAT9540 (75 wt % diethylene glycol solution of octyl acid potassium: manufactured by Pelron Corp.) and 0.2 parts of silicon surfactant were mixed to give a mixture which was used as the polyol mixture. The viscosity of the polyol mixture was 1,000 mPa·s/25° C.

The high-pressure polyurethane foaming machine (ASYSTEM60 with equipment of CANNOXIDE 3-9 as supply unit for liquid carbon dioxide and FPL14 mixing head: manufactured by Canon Inc.) equipped with a timer and switch-over valve to be able to control supply for liquid carbon dioxide by unit in 0.01 seconds was used. Temperature of the raw material was adjusted to 30° C. and the liquid carbonic dioxide was adjusted to 5° C. The mixing weight ratio of the polyisocyanate compound and the polyol mixture was set at 100:67.

The molding by the RIM method was used the mold (1) having the size of 9 mm(t)×300 mm×900 mm or the mold (2) having the size of 9 mm(t)×300 mm×450 mm, which has an injecting gate of 2 mm(t)×300 mm at the end of the mold. The first reaction mixture liquid was injected into the mold which was set at 60° C. and the molding was demolded at 6 minutes after start of injection. In case of the molding by the open injecting, the mold of 100 mm(t)×300 mm×300 mm was used. The first reaction mixture liquid was injected into the mold which was set at 60° C. and the molding was demolded 10 minutes after start of injection.

EXAMPLES

Reference Example 1

The measurement of the density of the skin is difficult because it is difficult to cut down only skin part from the molded article due to its thickness. Therefore the first reaction mixture liquid containing the polyisocyanate compound and the polyol mixture not containing the liquid carbon dioxide to give the skin of the molded article was cured in the open condition. The density and the average size of the cell of the molded article (the RIM molding) were measured. Those data was used as a guide for the forming condition of the skin and the high density part of the molded article.

As a result, the overall density in the opening condition was about 0.85 g/cm$^3$ and inner cell was fine with the average size of about 20 μm.

In case of the molded article having 9 mm thickness, the density in appropriate filling was about 0.9 g/cm$^3$ and the average size of the cell was fine with the size of less than about 20 μm.

Example 1

Using the mold (2), the discharge quantity of the polyisocyanate compound and the polyol mixture was set at 600 g/sec., the injection time was set at 1.2 sec. and the timer for the injection of liquid carbon dioxide was set to have the delay for 0.17 seconds. The quantity (the supply or injection quantity) of the liquid carbon dioxide was 4.5 g/sec. and the molded article with 0.55 g/cm$^3$ average density was prepared by the RIM method.

As the results of observing the molded article, it was confirmed that the molded article was properly filled in the mold and the surface had a generally dark color and high density. As the results of observing of the cutting sections at the distance of 10 cm and 40 cm from the injection gate with the microscope, respectively, the average cell sizes of all parts were less than 20 μm, a skin having a thickness of about 200 μm was formed in the part of 10 cm, and a skin having a thickness of about 70 μm was formed in the part of 40 cm. As for the other core parts, it was confirmed that the average cell size of any part were more than 100 μm with foaming.

Example 2

Using the mold (1), the discharge quantity of the polyisocyanate compound and the polyol mixture was set at 300 g/sec., the injection time was set at 4.2 sec. and the timer for the injection of liquid carbon dioxide was set to have the delay for 1.35 seconds. The quantity (the supply or injection quantity) of the liquid carbon dioxide was 2.25 g/sec. and the molded article with 0.52 g/cm$^3$ average density was prepared by the RIM method.

As the results of observing the molded article, it was confirmed that the molded article was properly filled in the mold and the surface had a generally dark color and high density. As the results of observing of the cutting sections at the distance of 10 cm, 45 cm and 80 cm from the injection gate with the microscope, respectively, the average cell sizes of all parts were less than 20 μm, a skin having a thickness of about 200 μm was formed in the part of 10 cm, and a skin having a thickness of about 700 μm was formed in the part of 45 cm. In the part of 80 cm from the injection part, skin with less than 20 μm of average cell size almost covered this part and the average density of this part was 0.95 g/cm$^3$. As for the other core parts, it was confirmed that the average cell size of any part was more than 100 μm with foaming.

Example 3

Using the mold (1), the discharge quantity of the polyisocyanate compound and the polyol mixture was set at 300 g/sec., the injection time was set at 4.4 sec. and the timer for the injecting of liquid carbon dioxide was to have the delay for 1.00 seconds. The timer for the continuous injection of the polyisocyanate compound and the polyol mixture after stop of injection of liquid carbon dioxide was set at 0.5 sec. The quantity of the liquid carbon dioxide was 2.25 g/sec. and the molded article with 0.52 g/cm$^3$ average density was prepared by the RIM method.

As the results of observing of the cutting sections at the distance of 10 cm, 45 cm and 80 cm from the injection gate with the microscope, respectively, the average cell sizes of all parts were less than 20 μm, a skin having a thickness of about 200 cm was formed in the part of 10 cm, and a skin having a thickness of about 700 μm was formed in the part of 45 cm. In the part of 80 cm from the injection part, skin almost covered the part and the average density of this part was 0.95 g/cm$^3$. As for the other core parts, it was confirmed that the average cell size of any part were more than 100 μm with foaming.

Also, the average size of the cell in the cutting section of the injection gate part was less than 20 μm and it was confirmed that the cell was fine with high density.

Example 4

Using the mold. (2), the discharge quantity of the polyisocyanate compound and the polyol mixture was set at 170 g/sec., the injection time was set at 4.2 sec. and the timer for the injection of liquid carbon dioxide was set to have the delay for 1.35 seconds. The quantity (the supply or injection quantity) of the liquid carbon dioxide was 0.8 g/sec. and the molded article with 0.56 g/cm$^3$ average density was prepared by the RIM method.

As the results of observing the molded article, it was confirmed that the molded article was properly filled in the mold and the surface had a generally dark color and high density. As the results of observing of the cutting sections at the distance of 10 cm and 40 cm from the injection gate with the microscope, respectively, the average cell sizes of all parts were less than 20 μm, a skin having a thickness of about 400 μm was formed in the part of 10 cm, and a skin having a thickness of about 700 μm was formed in the part of 40 cm. As for the other core parts, it was confirmed that the average cell size of any part were more than 100 μm with foaming.

Example 5

The discharge quantity of the polyisocyanate compound and the polyol mixture was set at 300 g/sec., the injection time was set at 6.5 sec. and the timer for the injection of liquid carbon dioxide was set to have the delay for 0.67 seconds. The quantity of the liquid carbon dioxide was 1.00 g/sec. and the molded article with 0.22 g/cm$^3$ average density was prepared by the open injection method.

As the results of observing the cutting section in the center of the surface (the mold bottom) of the molded article, it was confirmed that the average sizes of cell was less than 20 μm and the skin with about 1.0 mm thickness was made. And also it was confirmed that the core part was foamed clearly and the molded article having together the skin and the foamed core was prepared by one step.

Comparative Example 1

Although the molded article was prepared by the RIM method as in Example 1, the injection start of liquid carbon dioxide was the same time as the injection initiation of the polyisocyanate compound and the polyol mixture and also the injection stop of liquid carbon dioxide was the same time as the injection stop of the polyisocyanate compound and the polyol mixture. The molded article was filled in the mold and had the average density of 0.52 g/cm$^3$.

Although the cells in the cutting section of each part of molded article were uniform in the direction of thickness, it was proved that because the cell with the size of less than 20 μm was not on the surface of each part of molded article and also the cell with the sizes of more than 200 μm was on the liquid flow tip part, the skin was not formed in these both parts. Also the average density of the liquid flow tip part was 0.45 g/cm$^3$ which was lower than the density of Example 1.

Because the average size of the cell in the cutting section of the injecting gate part was not less than 20 μm and the fine cell was not formed, it was proved that the density of foam was not high.

Comparative Example 2

Although the molded article was prepared by the open injection method as in Example 3, the injection start of liquid carbon dioxide was the same time as the injection start of the polyisocyanate compound and the polyol mixture and also the injection stop of liquid carbon dioxide was the same time as the injection stop of the polyisocyanate compound and the polyol mixture. The average density of the molded article was 0.2 g/cm$^3$. As the results of observing the cutting section in the center of the surface (the mold bottom) of the molded article, the cell with more than 100 μm size was observed at the section near the surface and the cell with 500 μm size was observed at the lower part. The cell with less than 20 μm size was not at near the surface and the formation of skin was not observed.

The polyurethane molded articles of the present invention, for example, a flexible polyurethane foam and a semi-rigid polyurethane foam may be used in furniture, automobile interior components such as an arm rest, a steering wheel and a shift lever knob, shoe soles, and sporting goods. A rigid polyurethane foam has many applications such as an imitation lumber and a structural material.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. In a reaction injection molding process (RIM process) for producing a polyurethane foam molded article with a surface layer from a polyisocyanate compound, a polyol mixture comprising a polyol, a catalyst and a crosslinking agent, and a blowing agent, the improvement comprising arranging a molding machine capable of providing the polyisocyanate compound, the polyol mixture and the blowing agent such that, when the polyisocyanate compound, the polyol mixture and the blowing agent are continuously injected, the injection initiation of the blowing agent is delayed from injection initiation of the polyisocyanate compound and polyol mixture and wherein the quantity of polyisocyanate compound and the polyol mixture, to be fed before the injection initiation of the blowing agent, is from about 10 to about 50 weight % of the total quantity of polyisocyanate compound and the total quantity of polyol mixture, respectively and wherein the time from the injection initiation of the polyisocyanate compound and the polyol mixture to the injection initiation of the blowing agent is from 0.1 to 3.0 seconds.

2. The process according to claim 1, wherein the blowing agent is at least one selected from the group consisting of carbon dioxide, hydrocarbon, fluorinated hydrocarbon and water.

3. The process according to claim 2, wherein the blowing agent further contains a polyol.

4. A reaction injection molding process (RIM process) for producing a polyurethane foam molded article comprising combining a polyisocyanate compound, a polyol mixture containing polyol, a catalyst and a crosslinking agent, and a blowing agent, said method comprising:
   continuously injecting the polyisocyanate compound, the polyol mixture and the blowing agent into a mold with a molding machine capable of separately supplying the polyisocyanate compound, the polyol mixture and the blowing agent; and
   delaying for 0.1 to 3.0 seconds injection of the blowing agent until after initiating injection of the polyisocyanate compound and the polyol mixture wherein the quantity of polyisocyanate compound and the polyol mixture, to be fed before the injection initiation of the blowing agent, is from about 10 to about 50 weight % of the total quantity of polyisocyanate compound and the total quantity of polyol mixture, respectively.

5. The process according to claim 4, wherein the blowing agent is at least one selected from the group consisting of carbon dioxide, hydrocarbon, fluorinated hydrocarbon and water.

6. The process according to claim 5, wherein the blowing agent further contains a polyol.

7. The process according to claim 1, wherein after the injection of the blowing agent is finished additional polyisocyanate compound and potyol mixture are continuously injected.

* * * * *